Aug. 16, 1966 N. J. ANDERSON 3,267,358

PHASE SHIFTER NETWORKS

Filed July 16, 1962 2 Sheets-Sheet 1

INVENTOR.
Norman J. Anderson
BY
James J. Eisenman
ATTORNEY

INVENTOR.
Norman J. Anderson
BY
James C. Eiseman
ATTORNEY 3,267,358

PHASE SHIFTER NETWORKS

Norman J. Anderson, Boonton, N.J., assignor to North Atlantic Industries, Inc., Plainview, N.Y., a corporation of New York Filed July 16, 1962, Ser. No. 210,055
15 Claims. (Cl. 323—122)

This invention relates to improvements in electrical phase shift circuits of the type intended to shift the phase of an input signal by a nominally constant angle at any frequency within an appreciable frequency band.

In fixed angle phase shift circuits, the criteria determining precision, bandwidth, attenuation and variation of attenuation are conflicting; for example, a satisfactorily precise constant phase shift can be obtained throughout a practically useful frequency band, but at the expense of attenuation and/or variation of attenuation so severe as to render the shifted output practicably unusuable. On the other hand the use of active circuit elements, e.g. amplifiers, and reactance devices incorporating amplifiers to compensate for these attenuation factors (and to provide other functions such as signal subtraction) imposes a substantial and apparently insurmountable limitation on the reliable precision of the shifter. The need for these active elements has been a primary deterrent to the advances in phase shifter performance dictated by current technological demands.

It is thus one object of this invention to provide phase shifting techniques yielding broad band, precise and stable operation without dependence on active elements.

Another object of the invention is to effect simplifications in 90° phase shifters while at the same time improving the performance thereof.

Another object is to provide techniques for developing precision broad band 90° phase shift circuits using passive circuit elements, preferably only resistors and capacitors.

In addition to being burdened by dependence on active elements, the art heretofore has been hampered by the lack of generalized knowledge respecting the achievement of particular phase slope and attenuation characteristics. This deficiency is in part reflected by the failure heretofore to realize and exploit the properties of certain network configurations which yield highly desirable phase shift properties.

Thus, a still further object of the invention is to provide techniques for achieving any desired phase slope characteristic (including zero and positive slope) within the operating band of 90° phase shifting circuits.

A further object is to provide phase shifters of the foregoing type where substantial loading of the output is permissible without adverse effect on the performance.

These and other objects and advantages of the invention will be shown in part hereinafter and in part will be evident herefrom or may be learned by practice with the invention, the same being realized and attained by means of the instrumentalities set forth in the appended claims.

The invention consists in the novel steps, methods, parts, combinations and improvements herein shown and described.

Exemplary embodiments of the invention will be described with reference to the accompanying drawings, wherein:

FIG. 1 is a schematic block diagram illustrating generally the basic functional elements, and their interrelationship, of certain phase shift circuits according to the invention;

FIGS. 2 and 3 respectively are circuit diagrams of simple lag and lead networks;

Figure 1:
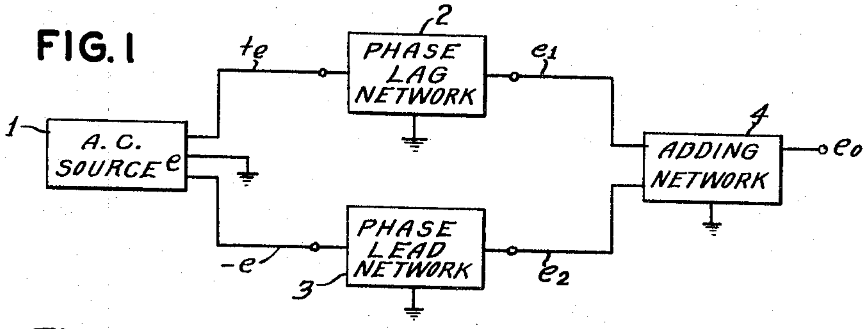

Referring to FIG. 1, means 1 are provided for supplying a pair of oppositely phased signals $+e$ and $-e$ having a common terminal represented by the ground symbol. Illustratively, means 1 may comprise a transformer, with a center-tapped secondary serving as this common or reference terminal. The potentials $+e$ and $-e$ (which may be different in amplitude from $e$) are applied to a phase lag network 2 and a complementary phase lead network 3 respectively. The network outputs are interconnected by means, 4, which may comprise a pair of summing resistors with a common output junction, whereby the outputs $e_1$ and $e_2$ of the networks 2 and 3 are combined vectorially to provide an output $e_0$.

Figure 2:
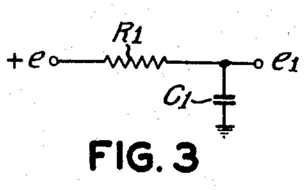
Figure 3:
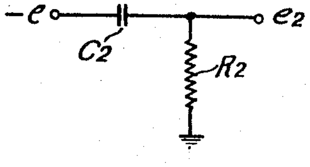

Referring to FIG. 2, a simple phase lag network that can be used in the system of FIG. 1 comprises a series resistor branch $R_1$ and a shunt capacitor branch $C_1$. FIG. 3 shows a similarly simple phase lead network, comprising a series capacitor branch $C_2$ and a shunt resistor branch $R_2$.

The output $e_1$ of the lag network of FIG. 2 lags the input $+e$ by an angle $\theta_1$ and the output of the lead network of FIG. 3 leads the input $-e$ by an angle $\theta_2$. The angles $\theta_1$ and $\theta_2$ depend in known manner upon the angular frequency $\omega$ of the source, and upon the respective RC products or time constants of the networks. It is sometimes convenient to denote the reciprocal of the time constant as the "break frequency." Thus, the break frequencies of the networks 2 and 3 are $$\omega_1=\frac{1}{R_1C_1}$$

and $$\omega_2=\frac{1}{R_2C_2}$$

By definition, the lag angle $\theta_1$ is 45° at $\omega_1$, and the lead angle $\theta_2$ is 45° at $\omega_2$.

The attenuations $\alpha_1$ and $\alpha_2$ of the networks 2 and 3 also depend on the frequency $\omega$ and upon the respective RC products of the networks; the amplitudes of $e_1$ and $e_2$ are $$\frac{e}{\alpha_1} \text{ and } \frac{e}{\alpha_2}$$

respectively. In the simple networks of FIGS. 2 and 3, the attenuation is numerically equal to the secant of the phase angle $\theta$. Thus $\alpha_1$ is sec $45°=\sqrt{2}$, or 3 db, at the break frequency $\omega_1$ and $\alpha_2$ is $\sqrt{2}$ at $\omega_2$ As seen from the foregoing, the amplitude and phase shift of the network outputs are a function of frequency and network parameters; at the break frequencies, these outputs are down 3 db and shifted in phase 45°. However, as will be seen hereinafter, these networks are combined to derive a net output having an amplitude and phase characteristic substantially less responsive to the effects of frequency than the component networks of the combination.

The mid band or design center frequency of the band over which the phase shifter is to be operated, is herein denoted as $\omega_0$. The phase lag and lead networks 2 and 3 are so designed that the geometric mean of the break frequencies is $\omega_0$: Thus $$\omega_1\omega_2=\omega_0^2$$

Subject to this condition, $\alpha_1=\alpha_2$ at $\omega_0$, and $e_1$ lags $+e$ by the same amount as $e_2$ leads $-e$. Accordingly, the vector sum $e_0$ of $e_1$ and $e_2$ lags $+e$ by exactly 90° at $\omega_0$.

It should be noted that this net phase shift is accomplished by virtue of the networks 2 and 3 and the oppositely phased input signals. This arrangement permits the simple summing action of outputs $e_1$ and $e_2$ whereby the 90° phase shift is secured. This summing action is effected without the need for active elements and external supplies. A similar advantage can be secured by energizing the lead and lag networks in parallel from an appropriately shielded and ungrounded transformer secondary, with the output ground or terminal reference being connected to one of the network outputs.

The attenuation $\alpha_0$ of $e_0$ with respect to $e$ at $\omega_0$ depends upon how close $\theta_1$ and $\theta_2$ are to 90° at $\omega_0$; expressed in another way, $\alpha_0$ is directly a function of the ratio $\omega_0/\omega_1$, which is equal to $\omega_2/\omega_0$.

The phase slope at $\omega_0$ depends upon how far the break frequencies $\omega_1$ and $\omega_2$ are from $\omega_0$, being inversely a function of the ratio $\omega_0/\omega_1$ (and $\omega_2/\omega_0$), and hence, inversely proportional to $\alpha_0$.

Figure 4:
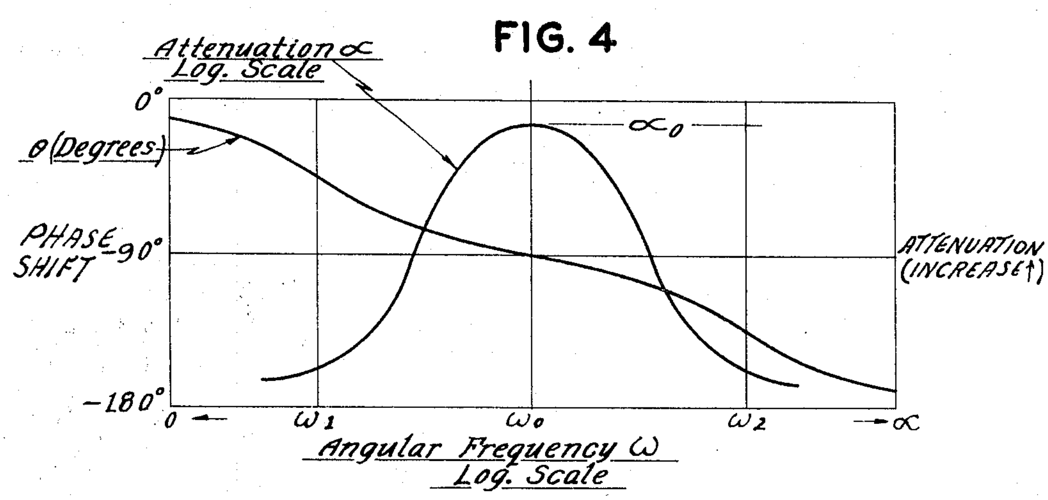
FIG. 4 is a graph showing the phase shift and attenuation characteristics of the phase shifter of FIG. 1 incorporating the networks of FIGS. 2 and 3.

Both the attenuation $\alpha$ and the phase angle $\theta$ of the output $e_0$ with reference to the input $e$ will vary with variation of the frequency $\omega$ from the design center frequency $\omega_0$. Referring to FIG. 4, $\theta$ is exactly $-90°$ at $\omega_0$, the negative sign indicating that $e_0$ lags $e$. The phase slope $d\theta/d\omega$ is negative at all frequencies (i.e. $e_0$ lags $e$ by an amount that increases monotonically with frequency), but exhibits a minimum value at $\omega_0$, and remains near the minimum through a range above and below $\omega_0$. The attenuation reaches a maximum value $\alpha_0$ at $\omega_0$. The attenuation slope $d\alpha/d\omega$ is zero at $\omega_0$, positive at lower frequencies, and negative at higher frequencies, remaining near the minimum value through a range above and below $\omega_0$.

The amount $\Delta\theta$ by which the phase angle $\theta$ departs from 90° with a departure $\Delta\omega$ from the center frequency $\omega_0$ is a direct function of the phase slope $d\theta/d\omega$ at $\omega_0$; accordingly, the networks of FIGS. 2 and 3 can be designed to make the circuit of FIG. 1 provide a nominal 90° phase shift to any degree of precision which will remain within specified narrow limits throughout a frequency band determined by the choice of $\omega_1$ and $\omega_2$. Although the attenuation becomes greater as the bandwidth and precision are increased, a usable output is nevertheless obtained and moreover, the variation in attenuation (and therefore output amplitude change) remains acceptably low because the attenuation slope is zero at midband.

Figure 5:
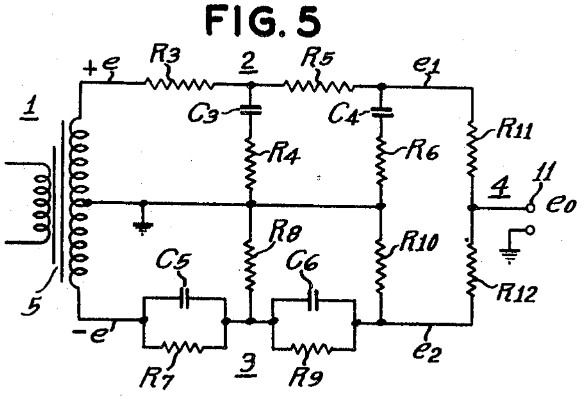
FIG. 5 is a circuit diagram illustrating another embodiment of the invention using cascaded lag step and cascaded lead step networks.

By way of comparison, a single channel phase lag network like that of FIG. 2 can be designed to provide a phase shift approaching 90° to any degree of precision; however, the attenuation approaches infinity and attenuation slope approaches 6 db per octave as the phase angle approaches 90°. The lead and lag networks herein before described all have a finite phase slope within the operating band. It has been discovered however, that other networks may be utilized to reduce the phase slope to a greater degree and in some cases to actually reduce this slope to zero while at the same time preserving a zero attenuation slope at $\omega_0$. Positive phase slopes may also be achieved. Referring to FIG. 5, the input section 1 comprises phase splitting means embodied as a transformer 5 with its secondary grounded at the center to provide the voltages $+e$ and $-e$ with respect to ground at the upper and lower terminals, as indicated. The lag network 2 comprises a lag step section formed by a series resistor branch $R_3$ and a shunt branch consisting of a serially combined capacitor $C_3$ and resistor $R_4$, followed by a similar lag step section $R_5$, $R_4$, $R_6$. A cascade lag step network of this kind can be designed in known manner to provide a transfer characteristic $\dot{e}_1/e$ as represented in polar form by the curve 9 in FIG. 6. The curve is the locus of the vector $e_1$ as a function of the frequency $\omega$, each point on the curve representing the vector $e_1$ at a respective value of $\omega$, starting at zero at the right-hand end of the curve and proceeding to infinity at the left-hand end.

Returning to FIG. 5, the phase lead network 3 comprises a lead step section formed by a series branch consisting of a capictor $C_5$ and a resistor $R_7$ in parallel with each other, and a shunt resistor branch $R_8$, followed by a similar lead step section $C_6$, $R_9$, $R_{10}$. This cascade lead step network is designed to provide a transfer characteristic $\dot{e}_2/e$ as represented by the curve 10 in FIG. 6.

The lead and lag networks are interconnected in additive relationship, illustratively by way of an adding network which consists of two resistors $R_{11}$ and $R_{12}$ connected from the respective outputs of the lag and lead networks to the common output terminal 11. Assuming the resistors $R_{11}$ and $R_{12}$ to be of the proper magnitude and equal, the voltage $e_0$ at the terminal 11 will be the vectorial average of $e_1$ and $e_2$, i.e.

$$\dot{e}_0=\frac{\dot{e}_1+\dot{e}_2}{2}$$

Returning to FIG. 6, it is seen that, owing to the reentrant shape of the left hand portion of the curve 9, there is a point 12 corresponding to a finite frequency where a tangent to the curve 9 is perpendicular to the $e$ axis. A similar point 13 is present on the curve 10. The lag and lead networks can be designed to place $\omega_0$ at the points 12 and 13 respectively. The vectors $e_1$ and $e_2$ will then be equal in amplitude at $\omega_0$, and equally and oppositely displaced from $-90°$, as shown. Thus, at $\omega=\omega_2$, the vectorial average $e_0$ is midway between the equal vectors $e_1$ and $e_2$, and is at an angle of exactly 90°.

If the frequency is increased from $\omega_0$ to a somewhat higher value $\omega_0+\Delta\omega$, the vector $e_1$ moves counter clockwise from the point 12 to say, a point 14 on the curve 9. The vector $e_2$ moves counterclockwise, from the point 13 to a point 15 on the curve 10. The mid-point of a line connecting the points 14 and 15 is substantially coincident with that of the line connecting the $\omega_0$ points 12 and 13. Thus, the output vector $e_0$ remains substantially the same at $\omega_0+\Delta\omega$ as at $\omega_0$. It is apparent without illustration that similar stability occurs when the frequency is lowered from $\omega_0$, causing the vectors $e_1$ and $e_2$ to rotate clockwise with respect to $e$.

Throughout the major portions of the transfer characteristics represented by curves 9 and 10, both vectors $e_1$ and $e_2$ rotate clockwise with increasing frequency. Accordingly, if the center frequency $\omega_0$ is located anywhere between $\omega=0$ and the frequency corresponding to the point 12 on the curve 9, say at a point 18, and at the symmetrical point 19 on the curve 10, the resultant vector $e_0$ will rotate clockwise about the origin 0 with increasing frequency. When the lag angle, which by convention is negative, increases with increasing frequency, the phase slope $d\theta/d\omega$ is negative.

If the center frequency $\omega_0$ is located between the point 12 and $\omega=\infty$ on the curve 9, for example at the point 20, and at the symmetrical point 21 on the curve 10, the vector $e_0$ will rotate counterclockwise with increasing frequency, and the phase slope is positive. The phase slope is exactly zero only when the $\omega_0$ points are at 12 and 13, where the re-entrant portions of the curves 9 and 10 start, as the frequency is increased and decreased respectively.

Figure 6:
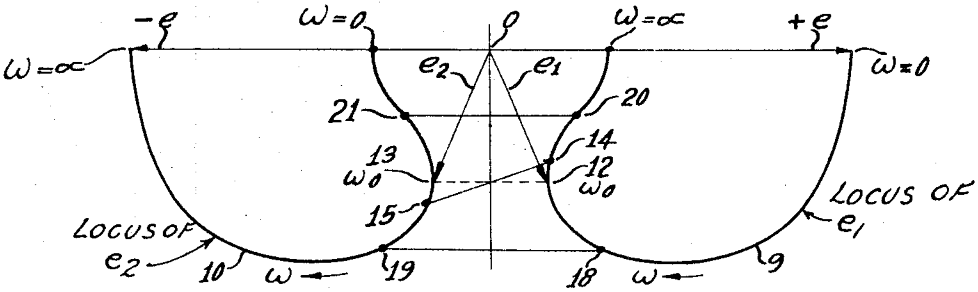
FIG. 6 is a polar diagram showing the transfer characteristics of the lead and lag networks of FIG. 5.

A quantitative evaluation of the diagram of FIG. 6 also demonstrates that both the attenuation slope and the phase slope are zero at $\omega_0$. Further, both slopes will be zero at $\omega_0$ and the amplitude and phase response of $e$ will remain unchanged regardless of the lateral separation of the curves 9 and 10 from each other along the $e$ axis. At values of $\omega$ other than $\omega_0$ the phase and amplitude slopes depart from zero in a manner corresponding to the departure of the curves 9 and 10 from their tangents at the points 12 and 13.

It is of interest to note that both the attenuation and phase slopes can be made zero at $\omega_0$ using any type networks having polar transfer characteristics exhibiting symmetrical points of vertical tangency at a finite frequency.

Zero attenuation slope can be obtained by network combinations having the effect of placing $\omega_0$ at any two symmetrically disposed points on the pair of complementary polar transfer characteristics describing the networks, where the tangents at said points have mirror symmetry.

Figure 8:
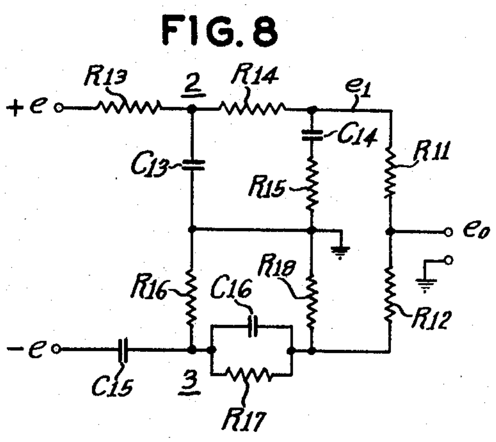
FIG. 8 is a circuit diagram illustrating a phase shifter having the characteristics shown in FIG. 7.

FIG. 8 shows another circuit using two sections in each network. The lag network 2 comprises a section $R_{13}$, $C_{13}$ similar to the simple lag section of FIG. 2, followed by a step lag $R_{14}$, $C_{14}$, $R_{15}$ similar to one of the step lag sections of the lag network of FIG. 5. The lead network 3 similarly comprises a simple lead section $C_{15}$, $R_{16}$, followed by a step lead section $C_{16}$, $R_{17}$, $R_{18}$. The outputs $e_1$ and $e_2$ of the lag and lead networks are combined by means of resistors $R_{11}$ and $R_{12}$, as in the circuit of FIG. 5.

Figure 7:
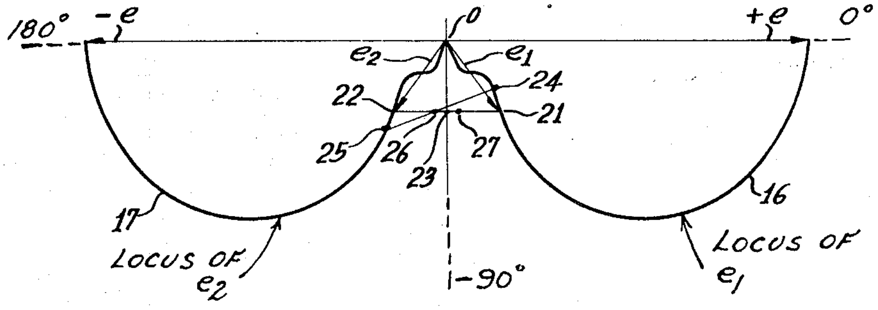
FIG. 7 is a polar diagram showing transfer characteristics of still another embodiment of the invention.

Referring to FIG. 7, the curves 16 and 17 represent transfer characteristics of a type conveniently realizable with the circuit of FIG. 8 by appropriate design of the respective phase lag and phase lead networks. With the networks designed to place $\omega_0$ at points 21 and 22 $e_0$ will be midway therebetween, intersecting the midpoint 23. If the frequency is increased such that $e_1$ shifts to intersect point 24 and $e_2$ to intersect point 25, $e_0$ moves a relatively small distance, to intersect point 26. Similarly, if the frequency is decreased from $\omega_0$, $e_0$ shifts to intersect point 27. It is thus seen that operation with $\omega_0$ at points 21 and 22 provides zero attenuation slope and a small negative phase slope.

The lag section $R_{13}$, $C_{13}$ has a break frequency $\omega_a$, like the break frequency, $\omega_1$ in the circuit of FIG. 2. The lag step section $R_{14}$, $C_{14}$, $R_{15}$ exhibits two break frequencies, $\omega_b$ and $\omega_c$, attributable to the combinations $R_{14}$, $C_{14}$ and $R_{15}$, $C_{14}$ respectively. Similarly, the lead section $C_{15}$, $R_{16}$ has a break frequency $\omega_d$, and the step lead section has two break frequencies $\omega_e$ and $\omega_f$.

The circuit of FIG. 8 is preferably designed to operate under the following conditions:

$$\omega_b = \omega_d = \omega_1$$
$$\omega_c = \omega_e = \omega_0$$
$$\omega_a = \omega_f = \omega_2$$
$$\omega_0^2 = \omega_1\omega_2$$

The attenuation slope is zero at $\omega_0$, and the minimum phase slope is accompanied by maximum attenuation at $\omega_0$, as in the circuit of FIG. 1 using the networks of FIGS. 2 and 3.

Figure 9:
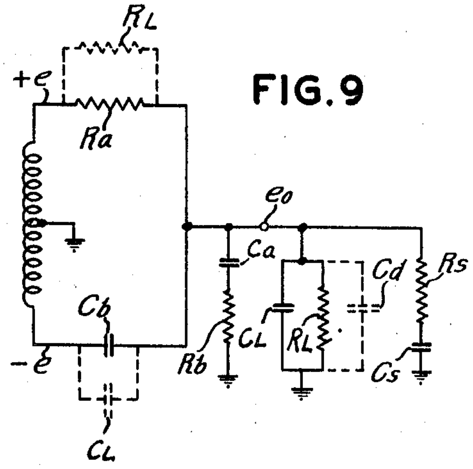
FIG. 9 is a circuit diagram illustrating a phase shifter according to the invention which has transfer characteristics similar to those of the circuit of FIG. 8 but wherein there is embodied a different mode of coordinating and combining the phase lag and phase lead networks.

FIG. 9 illustrates another embodiment in which the lead and lag networks are interconnected so that their respective outputs are implicitly added in a common branch. This branch also contributes to the lead and lag functions. Circuits following the example of FIG. 9 are compatible with a wider range of load conditions and are emenable to virtually full compensation for any specified load condition.

In FIG. 9 the shunt branches of the lag and lead networks are combined to form a single common shunt branch comprising a capacitor $C_a$ and a resistor $R_b$ in series with each other. The series branch of the lag network comprises a resistor $R_a$, and the series branch of the lead network embodies a capacitor $C_b$. Since the outputs of the lag and lead networks are presented to a common output terminal at the junction of the series branches with the shunt branch, no separate adding means is required.

The common shunt branch $C_a$, $R_b$ causes interaction between the lag and lead networks, with the result that each network exhibits three break frequencies similar to those of the networks 2 and 3 in the circuit of FIG. 8. It can be shown mathematically that the transfer characteristic $e_0/e$ of the circuit of FIG. 9 is identical with that of FIG. 7 as shown in FIG. 8, providing $$\frac{1}{R_aC_b} = \frac{1}{R_bC_a} = \omega_0$$

The attenuation at $\omega_0$ is $$\alpha_0 = 1 + \frac{R_a}{2R_b}$$

where $$\frac{R_a}{R_b} = \frac{C_a}{C_b}$$

the phase slope is $$\frac{d\theta}{dp} = -\frac{2\alpha_0(1+p^2)}{(1-p^2)+4\alpha_0^2p^2}$$

where $$p = \frac{\omega}{\omega_0}$$

and $$dp = \frac{d\omega}{\omega_0}$$

The phase slope at $\omega_0$, where $p=1$, is simply $1/\alpha_0$, radians per fractional change in frequency.

In a typical design of the circuit of FIG. 9 for a center frequency of 400 cycles per second, $\omega_0 = 2\pi 400 = 2512$ radians per sec.
$R_a = 10{,}000$ ohms
$R_b = 2{,}500$ ohms
$C_a = 0.16$ microfarad
$C_b = 0.04$ microfarad.

The attenuation at $\omega_0$ is $$1 + \frac{10{,}000}{2(2500)} = 3$$

that is, the amplitude of the output $e_0$ is one-third of what it would be if the frequency were zero, or infinity. Expressed another way, the insertion loss of the phase shifter at $\omega_0$ is about 9.5 db.

The phase slope is $$\frac{1}{\alpha_0} = \frac{1}{3}$$

that is, the rate of departure of the phase angle from 90° with departure of the frequency from 400 cycles per second is one-third radian per radian per second, which is about 0.048 degrees per cycle per second.

The above design can easily be modified to accommodate the load of a typical utilization device. Suppose, for example, the load is simply a resistor $R_L$ (FIG. 9). A capacitor $C_L$ is shunted across $R_L$ and its value so chosen that $$R_LC_L = R_aC_b$$

Any distributed capacitance $C_d$ present across the load $R_L$ may be accounted for by making the actual value $C_L'$ of the capacitor correspondingly smaller: $C_L' = C_L - C_d$. The effect of the load elements $R_L$ and $C_L$ on the circuit, assuming negligible driving point impedance is exactly the same as if $R_L$ were shunted across the resistor $R_a$ and $C_L$ were shunted across the capacitor $C_b$, as indicated in dotted lines in FIG. 9. This effect can be compensated by making the actual value $R_a'$ of the resistor $R_a$ somewhat higher, so that the parallel combination of $R_a'$ and $R_L$ equals $R_a$:

$$R_a'=\frac{R_aR_L}{R_L-R_a}$$

and making the actual value $C_b'$ smaller than $C_b$:

$$C_b'=C_b-C_L$$

If the load impedance or a component of it is in the form of a resistor $R_s$ and a capacitor $C_s$ in series with each other, either $R_s$ can be modified by the addition of a series resistor, or $C_s$ can be modified by the addition of a shunt capacitor to make $R_sC_s=R_bC_a$. In addition, the values of the resistor $R_b$ and capacitor $C_a$ are changed to:

$$R_b'=\frac{R_bR_s}{R_s-R_b}$$

$$C_a'=C_a-C_s$$

The series parallel combination of $R_b'$, $C_a'$ and $R_s$, $C_s$ will be equivalent to $R_b$, $C_a$. In fact the foregoing methods may be used together to account for any particular combination of $R_L$, $C_L$, $R_s$ and $C_s$.

Returning to FIG. 7, it is seen that the curve 16 approximates a straight line in the vicinity of point 21. Similarly, a corresponding portion of the curve 17 approximates a straight line. If the two portions were truly rectilinear and mirror images of each other, and $\omega_0$ were at their midpoints, the attenuation slope of the phase shifter would be approximately zero over the frequency range represented by the straight portions of the curves, and the phase slope would be approximately constant at a value determined by the angles of the straight portions $e_1$ and $e_2$, approaching zero as said angles approach 90°.

The transfer characteristics of phase shift networks may be made to approximate rectilinearity to a high degree of precision, and throughout a wide frequency band, by using a sufficient number of cascaded sections like those of the networks shown in FIGS. 5 and 8, since each RC pair in each section affords a respective design parameter.

Figure 10:
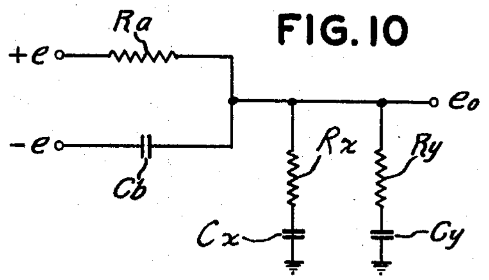
FIG. 10 is a circuit diagram illustrating a modification of the circuit of FIG. 9.

A simple application of the foregoing is illustrated in FIG. 10, which shows a modification of the circuit of FIG. 9 wherein the common shunt branch $C_a$, $R_b$ is replaced by two common shunt branches $R_x$, $C_x$ and $R_y$, $C_y$. The respective shunt branch break frequencies $$\omega_x=\frac{1}{R_xC_x}$$

$$\omega_y=\frac{1}{R_yC_y}$$

and are so chosen that $$\omega_x\omega_y=\omega_0^2$$

The design parameters obtained by splitting the shunt branch as in FIG. 10 can be used to improve the performance over that of the circuit of FIG. 9 by reducing the phase error and amplitude change over the operating band, or by increasing the operating bandwidth while maintaining the same precision, or by a combination of both kinds of improvement. The specific choice of the break frequencies $\omega_x$ and $\omega_y$ in a particular case will depend upon how the improvement is to be allocated between bandwidth and precision.

In a typical design of the circuit of FIG. 10 for a center frequency of 400 cycles per second, $R_a$=10,000 ohms
$C_b$=.04 microfarads
$R_x$=2,400 ohms
$R_y$=1,200 ohms
$C_x$=0.334 microfarads
$C_y$=0.167 microfarads.

The attenuation $\alpha_0$ is 6, and $\omega_x=2\pi200$ radians per second
$\omega_y=2\pi800$ radians per second The load impedance $R_L$, $C_L$ and/or $R_s$, $L_s$ can be accommodated in the manner described above with reference to the circuit of FIG. 9.

The above design of the circuit of FIG. 10 operates over a frequency range of 380 to 420 cycles per second with a maximum phase error of 0.91 degrees and a maximum variation in attenuation of ±.035%. The insertion loss at 400 cycles is 15.6 db.

Although the above described embodiments utilize the voltage-to-voltage transfer functions of networks wherein the reactance elements are capacitive, it is to be understood that the invention may be practiced using known analagous voltage and/or current transfer functions and networks including inductive reactance elements. While the invention has been described specifically with regard to 90 degree phase shifters, the circuits and methods may be applied to nominally fixed phase shifters for angles of other than 90 degrees.

I claim:

1. A phase shifter for producing a substantially constant 90° phase shift and substantially constant attenuation of an input voltage throughout a frequency band, comprising a phase lead network and a phase lag network, said networks having respective characteristic break frequencies disposed symmetrically above and below the center frequency of said band and designed to produce substantially equal attenuations at the center frequency and respective phase shifts that are opposite in sense but substantially equal in magnitude at said center frequency, said networks having a common reference and each having an input terminal and an output terminal, a pair of input circuit means connected to said input terminals for applying said input voltage thereto, and a pair of output circuit means connected to said output terminals for combining the outputs of said networks to produce a resultant output voltage, one of said input and output circuit means comprising connections to one of said input and one of said output network terminals in opposite polarities with respect to a reference potential common to the input and output circuits and the other comprising connections to the other of said input and the other of said output network terminals in like polarity with respect to the reference.

2. The invention set forth in claim 1, wherein said phase lag network includes at least two cascaded lag step sections proportioned to provide a polar transfer characteristic consisting of the transfer function as a function of frequency having a point of substantially vertical tangency at said center frequency, and said lead network includes at least two cascaded lead step sections proportioned to provide a polar transfer characteristic consisting of the transfer function as a function of frequency having a point of substantially vertical tangency at said center frequency.

3. The invention set forth in claim 1, wherein said lag and lead networks each include a section having a series arm and a shunt arm, one of said arms comprising a reactance element and the other of said arms comprising a resistance element, the values of said elements being such that the reactance is equal in magnitude to the resistance in one of said sections at a first frequency $\omega_1$ and the reactance is equal in magnitude to the resistance in the other of sections at a second frequency $\omega_2$ and $\omega_1\omega_2=\omega_0^2$, where $\omega_0$ is said center frequency.

4. A phase shifter for producing a substantially constant 90° phase shift and substantially constant attenuation of an input signal throughout a frequency band, comprising a phase lead network and a phase lag network having, respectively, characteristic break frequencies disposed symmetrically above and below the center frequency of said band, means for applying an input signal to one of said networks in one polarity and to the other of said networks in the opposite polarity, said networks being designed to produce substantially equal attenuations at the center frequency of said band and respective phase shifts that are opposite in sense but substantially equal in magnitude at said center frequency, and means for combining the outputs of said networks to produce a resultant output signal shifted substantially 90° with respect to the input over the frequency band.

5. The invention set forth in claim 4, wherein said lag and lead networks each include a series arm and a shunt arm, the output ends of said series arms being connected to a common output terminal.

6. The invention set forth in claim 4, wherein said lag and lead networks include a common shunt arm that also acts as said passive means for additively combining the outputs of said networks.

7. The invention set forth in claim 6, wherein the series arm of said lag network is a resistor $R_a$, the series arm of said lead network is a capacitor $C_b$, and the common shunt arm comprises a resistor $R_b$ and a capacitor $C_2$ in series with each other, the values of said resistors and capacitors being related as follows:

$$\frac{1}{R_aC_b}=\frac{1}{R_bC_a}=\omega_0$$

and $$\frac{R_a}{R_b}=\frac{C_a}{C_b}=a$$

where $\omega_0$ is the design center frequency and $a$ is greater than unity.

8. The invention set forth in claim 6, wherein the series arm of said lag network is a resistor $R_a$, the series arm of said lead network is a capacitor $C_b$, and the common shunt arm is a series-parallel circuit comprising a resistor $R_x$ and a capacitor $C_x$ in series with each other, in parallel with a resistor $R_y$ and capacitor $C_y$ in series with each other, said resistors and capacitors being related as follows:

$$\frac{1}{R_aC_b}=\omega_0$$

$$\frac{1}{R_xC_x}=\omega_x$$

$$\frac{1}{R_yC_y}=\omega_y$$

wherein $$\sqrt{\omega_x\omega_y}=\omega$$

the design center frequency.

9. A phase shifting circuit for shifting the phase of a signal by a nominally constant amount substantially independent of frequency within a predetermined band comprising a lead network and complementary lag network, said networks having corresponding break frequencies substantially different and disposed on opposite sides of the center frequency of said band, said lead and lag networks being arranged for energization in accordance with an input signal, and having outputs interconnected in combining relationship.

10. A phase shifting circuit according to claim 9, in which said outputs are interconnected by way of passive adding means.

11. A phase shifting circuit according to claim 9, in which said networks include a common branch adapted to provide lead and lag functions as well as to provide said combining relationship.

12. A phase shifting circuit according to claim 9, in which said lead and lag networks consist essentially of passive elements.

13. A phase shifting circuit according to claim 9, in which said networks comprise resistive-reactive elements for producing respective polar responses having irregular, out-of-round portions disposed symmetrically as mirror images of one another in adjacent quadrants.

14. A phase shifting circuit according to claim 9, in which said networks comprise resistive-reactive elements for producing respective polar responses having tangents at finite frequencies which are orthogonal to the vector characterizing said signal to be shifted.

15. A phase-shifting network according to claim 9 in which each network affords a plurality of break frequencies.

References Cited by the Examiner

UNITED STATES PATENTS

| | | | |
|---|---|---|---|
| 2,627,598 | 2/1953 | Browder et al. | 323—119 |
| 2,907,939 | 10/1959 | Sant Angelo | 324—83 |
| 3,054,064 | 9/1962 | Sherman | 324—82 |

JOHN F. COUCH, *Primary Examiner.*

LLOYD McCOLLUM, *Examiner.*

D. L. RAE, A. D. PELLINEN, *Assistant Examiners.*